United States Patent
Chang et al.

(10) Patent No.: US 8,032,675 B2
(45) Date of Patent: Oct. 4, 2011

(54) DYNAMIC MEMORY BUFFER ALLOCATION METHOD AND SYSTEM

(75) Inventors: Naichih Chang, Shrewsbury, MA (US); Pak-Lung Seto, Shrewsbury, MA (US); Victor Lau, Marlboro, MA (US)

(73) Assignee: Intel Corporation, Santa Clara, CA (US)

( * ) Notice: Subject to any disclaimer, the term of this patent is extended or adjusted under 35 U.S.C. 154(b) by 1198 days.

(21) Appl. No.: 11/320,392

(22) Filed: Dec. 28, 2005

(65) Prior Publication Data

US 2007/0150683 A1    Jun. 28, 2007

(51) Int. Cl.
G06F 3/00 (2006.01)
G06F 5/00 (2006.01)

(52) U.S. Cl. .......................................... 710/56; 711/170
(58) Field of Classification Search .............. 710/56
See application file for complete search history.

(56) References Cited

U.S. PATENT DOCUMENTS

| | | | | |
|---|---|---|---|---|
| 4,603,382 A * | 7/1986 | Cole et al. | | 710/56 |
| 5,379,412 A * | 1/1995 | Eastridge et al. | | 711/162 |
| 5,561,785 A * | 10/1996 | Blandy et al. | | 711/170 |
| 5,682,553 A * | 10/1997 | Osborne | | 710/56 |
| 5,687,392 A * | 11/1997 | Radko | | 710/22 |
| 5,784,698 A * | 7/1998 | Brady et al. | | 711/171 |
| 5,983,289 A * | 11/1999 | Ishikawa et al. | | 710/35 |
| 6,263,337 B1 * | 7/2001 | Fayyad et al. | | 1/1 |
| 6,549,982 B1 * | 4/2003 | Yamanaka | | 711/118 |
| 7,299,269 B2 * | 11/2007 | Elving | | 709/218 |
| 7,451,254 B2 * | 11/2008 | Peterson et al. | | 710/52 |
| 2004/0141650 A1 * | 7/2004 | Hansson et al. | | 382/232 |
| 2007/0074221 A1 * | 3/2007 | Stenson et al. | | 718/106 |

OTHER PUBLICATIONS

Serial ATA II: Extensions to Serial ATA 1.0a Revision 1.2 ; Aug. 27, 2004, 110 pgs.
"American National Standard for Information Technology—Fibre Channel—Physical and Signalling Interface-3 (FC-PH-3)", *Developed by incits, Where IT all Begins, Table of Contents*, (1998), 6 pgs.
"PCI Express Base Specification Revision 1.0", *PCI Express, Table of Contents*, (Jul. 22, 2002), 15 pgs.
"PCI-X Addendum to the PCI Local Bus Specification", *Revision 1.0a, Table of Contents*, (Jul. 24, 2000), 9 pgs.
"Serial ATA: High Speed Serialized AT Attachment, Serial ATA Workgroup", *Revision 1.0a, Table of Contents*, APT Technologies, Inc., (Jan. 7, 2003), 10 pgs.
"Working Draft American National Standard, Project T10/1601-D", *Revision 1, Table of Contents*, Information Technology—Serial Attached SCSI-1.1 (SAS-1.1),(Sep. 18, 2003), 24 pgs.

* cited by examiner

*Primary Examiner* — Henry Tsai
*Assistant Examiner* — Elias Mamo
(74) *Attorney, Agent, or Firm* — Grossman, Tucker, Perreault & Pfleger, PLLC (57) ABSTRACT

A method, computer program product, system (including a circuit card), and integrated circuit for initializing a buffer pool, such that the buffer pool includes a plurality of data buffers available for use during a plurality of I/O transfers. In response to the initiation of a first I/O transfer concerning a first data portion being transferred from a first data source to a first data target, the first data portion is written to a first portion of the plurality of data buffers. The first data portion is transferred to the first data target, and the first portion of the plurality of data buffers is released back to the buffer pool for use during one or more subsequent I/O transfers.

24 Claims, 7 Drawing Sheets

DYNAMIC MEMORY BUFFER ALLOCATION METHOD AND SYSTEM

TECHNICAL FIELD

This disclosure relates to buffer allocation methods and systems and, more particularly, to dynamic buffer allocation methods and systems.

BACKGROUND

Upon initiating an I/O (i.e., input/output) transfer, a software application or a device driver may allocate memory resources for use during the transfer. An example of such an allocation is the generation of a scatter-gather list (i.e., SGL) that includes address-length (i.e., A/L) buffer pairs.

Unfortunately, the structure and usage of e.g., SGLs tend to be rigid, resulting in inefficient use of memory resources. For example, often the minimum memory resource allocation unit is an SGL segment, which typically defines a plurality of A/L buffer pairs. Therefore, for even small I/O transfers, an entire SGL segment may be utilized. Accordingly, for small I/O transfers that require less than all of the memory buffers for an SGL segment (or for I/O transfers that do not end on an SGL segment boundary), a considerable amount of unused buffer space may be wasted.

BRIEF DESCRIPTION OF THE DRAWINGS

The details of one or more implementations of this disclosure are set forth in the accompanying drawings and the description below. Other features and advantages will become apparent from the description, the drawings, and the claims.

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims

DETAILED DESCRIPTION OF THE PREFERRED EMBODIMENTS

Figure 1A:
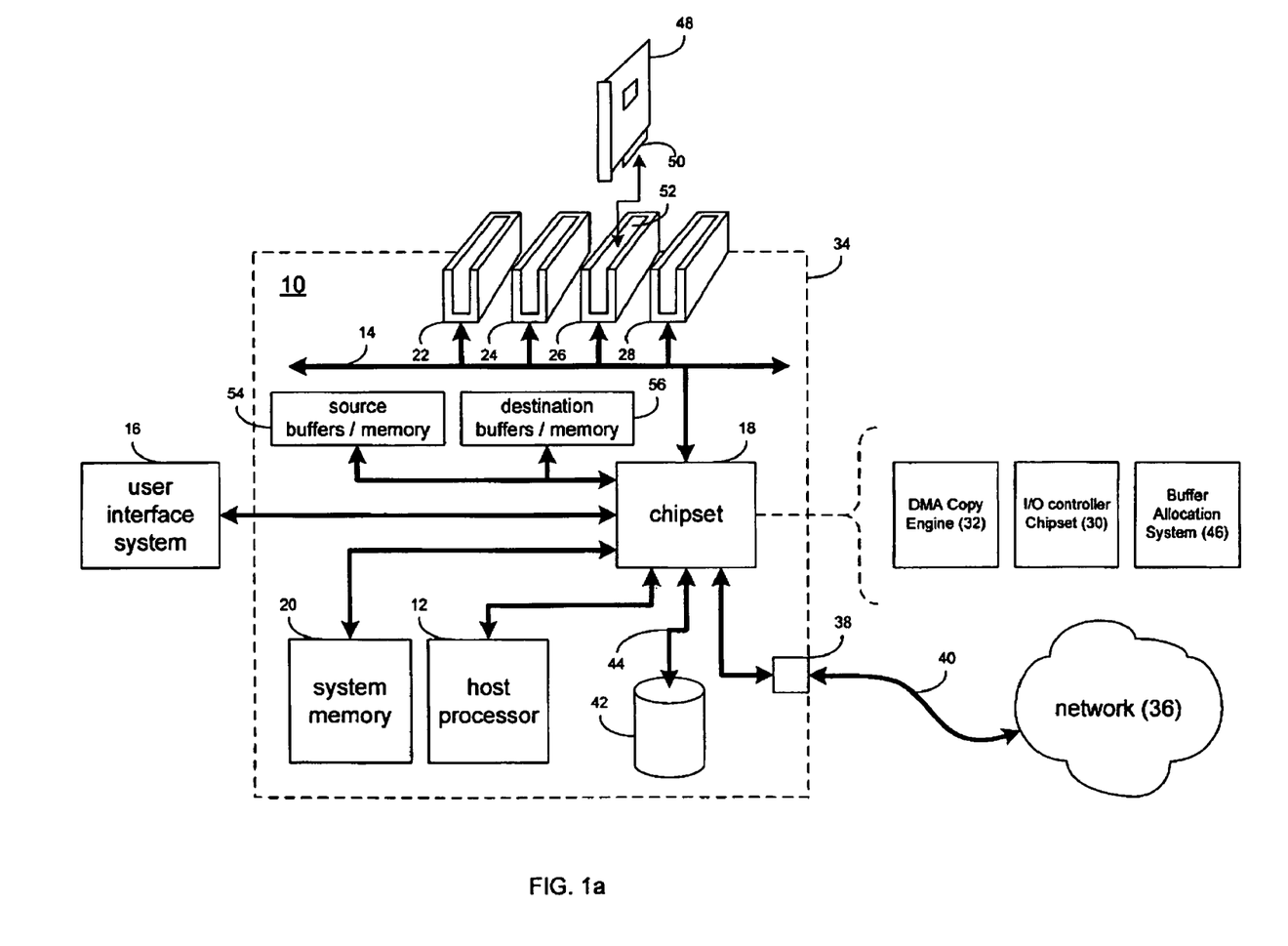
FIG. 1a is a diagrammatic view of a buffer allocation system included within a computer system.

Referring to FIG. 1a, there is shown a computer system 10 that may include a host processor 12, a bus 14, a user interface system 16, a chipset 18, system memory 20, and a one or more expansion slots 22, 24, 26, 28.

Host processor 12 may include any variety of processors known in the art such as an Intel® Pentium® IV processor commercially available from the Assignee of the subject application. Bus 14 may include various bus types for transferring data and commands. For example, bus 14 may comply with the Peripheral Component Interconnect (PCI) Express™ Base Specification Revision 1.0, published 22 Jul. 2002, available from the PCI Special Interest Group, Portland, Oreg., U.S.A. (hereinafter referred to as a "PCI Express™ bus"). Bus 14 may also comply with the PCI-X Specification Rev. 1.0a, 24 Jul. 2000, which is also available from the PCI Special Interest Group, Portland, Oreg., U.S.A.

User interface system 16 may include a variety of devices (e.g., keyboards, pointing devices, video displays, and speaker systems; not shown) for allowing users to provide input/data to and receive output/data from computer system 10. Chipset 18 may include a host bridge/hub system (not shown) that couples processor 12, user interface system 16, and system memory 20 to each other via bus 14. Chipset 18 may further include one or more integrated circuit chips, such as those commercially available from the assignee of the subject application, examples of which may include graphics memory (not shown), I/O controller chipset 30, and a direct memory access (i.e., DMA) copy engine 32, for example), although additional/other integrated circuit chips may be used. Processor 12, bus 14, chipset 18, system memory 20, and expansion slots 22, 24, 26, 28 may be integrated onto one circuit board (e.g. system board 34).

Chipset 18 may include one or more integrated circuits (e.g., I/O controller chipset 30) for receiving data from and/or providing data to an external network 36 (e.g., the Internet, a local area network, and/or a wide area network, for example) using at least one of a plurality of communication protocols (e.g., internet protocol, hypertext transfer protocol, file transfer protocol, for example). Chipset 18 may be connected to network 36 via a network port 38 and an external cable 40 that is connected to a network device (e.g., a switch or a router; not shown).

Chipset 18 may include one or more integrated circuits (e.g., I/O controller chipset 30) for receiving data from and/or providing data to a storage device 42 (e.g., a hard drive, an optical drive, a RAID array and/or a tape drive, for example) using at least one of a plurality of communication protocols (e.g., SATA "Serial Advanced Technology Attachment" protocol; PATA "Parallel Advanced Technology Attachment" protocol; SCSI "Small Computer System Interface" protocol; FC "Fibre Channel" protocol; and SAS-SSP "Serial Attached Small Computer System Interface" protocol, for example).

The FC protocol may comply with or be compatible with the protocol described in "ANSI Standard Fibre Channel Physical and Signaling Interface-3 X3.303:1998 Specification."

The SATA protocol may comply with or be compatible with the protocol described in "Serial ATA: High Speed Serialized AT Attachment," Revision 1.0a, published on Jan. 7, 2003 by the Serial ATA Working Group and/or the protocol described in "Serial ATA II: Extensions to Serial ATA 1.0a," Revision 1.2, published Aug. 27, 2004 by the Serial ATA Working Group and/or earlier and/or later published versions of the SATA standard.

The SAS-SSP protocol may comply with or be compatible with the protocol described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by American National Standards Institute (hereinafter termed the "SAS Standard") and/or earlier and/or later published versions of the SAS Standard.

Chipset 18 may be coupled to storage device 42 via data cable 44, examples of which include a SATA cable, a PATA cable, a fibre cable and/or a SCSI cable.

Additionally, chipset 18 may further include buffer allocation system 46 (to be discussed below in greater detail) which may be capable of maintaining a pool of data buffers for use during I/O transfers between e.g., storage device 42 and a software application (not shown) being executed by host processor 12. Buffer allocation system 46 may be implemented in dedicated hardware circuits and/or state machine circuits that may offer enhanced data transmission capabilities (i.e., increased performance). Additionally/alternatively, buffer allocation system 46 (or portions thereof) may be implemented in software and/or firmware, without departing from the spirit and scope of this embodiment.

Expansion card 48 (e.g., video cards, hard drive controllers, and network interface cards, for example) may be configured to be removably inserted into an expansion slot (e.g., expansion slots 22, 24, 26, 28, for example). When expansion card 48 is properly inserted into an expansion slot, connectors 50, 52 (incorporated into expansion card 48 and expansion slot 26 respectively) become electrically and mechanically coupled to each other. When connectors 50, 52 are so coupled to each other, expansion card 48 becomes electrically coupled to bus 14 and may exchange data and/or commands with host processor 12, user interface system 16, and/or system memory 20 (via bus 14 and chipset 18). Alternatively and without departing from this embodiment, the operative circuitry of expansion card 48 may be incorporated into other structures, systems and/or devices (e.g., system board 34). As used in any embodiment herein, "circuitry" may comprise, for example, singly or in any combination, hardwired circuitry, programmable circuitry, state machine circuitry, and/or firmware that stores instructions executed by programmable circuitry.

Figure 1B:
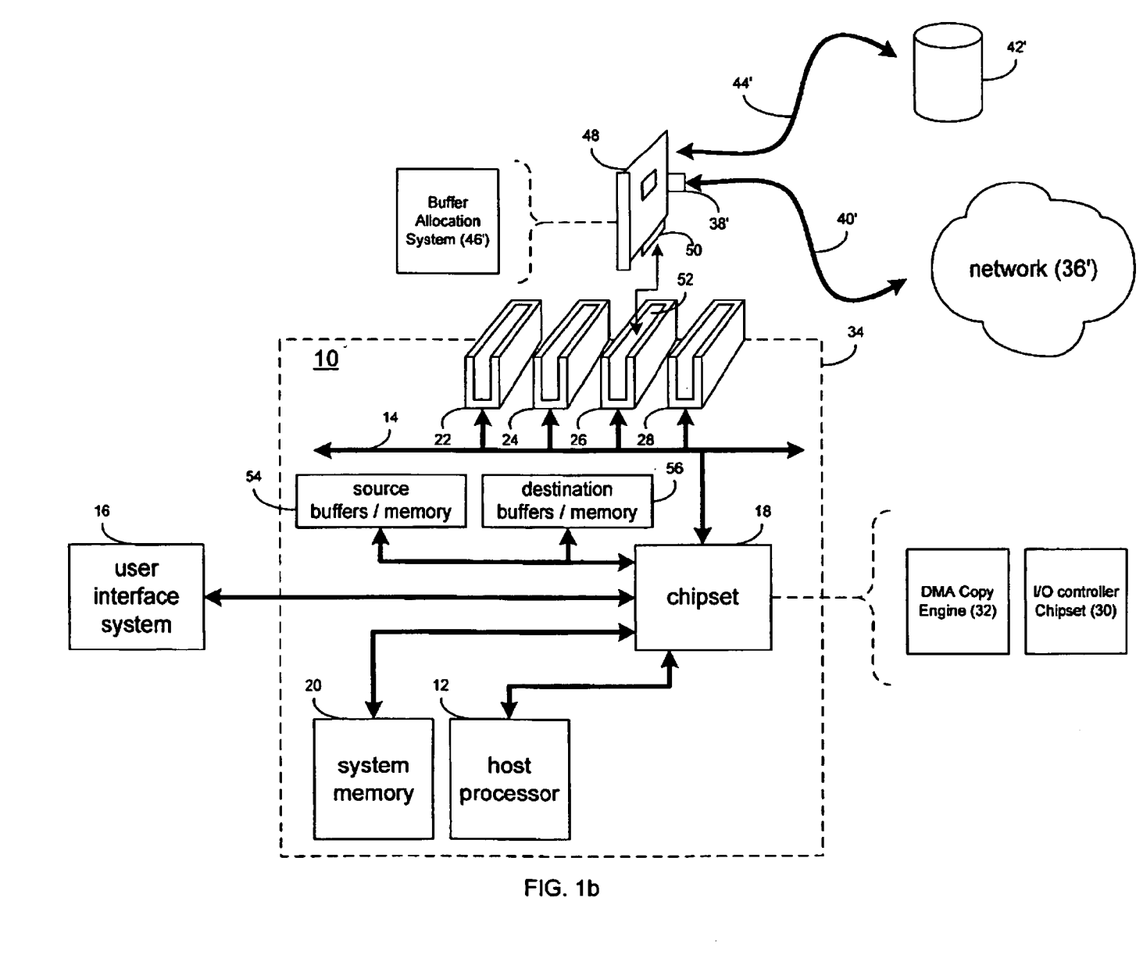
FIG. 1b is a diagrammatic view of an alternative embodiment of the buffer allocation system of FIG. 1.

Referring also to FIG. 1b, as discussed above, expansion card 48 may be e.g., a network interface card, a hard drive controller card, or a video card, for example. Accordingly, expansion card 48 may include integrated circuit chips (not shown) for receiving data from e.g., an external network 36' (which may comprise, for example, the Internet, a local area network, or a wide area network) using one of many protocols (e.g., internet protocol, hypertext transfer protocol, file transfer protocol, for example). Expansion card 48 may be connected to network 36' via a network port 38' and an external cable 40' that is connected to a network device (e.g., a switch or a router; not shown).

Alternatively/additionally and for further exemplary purposes, expansion card 48 may include integrated circuit chips (not shown) for receiving data from e.g., storage device 42', which may be located within computer system 10 or external to computer system 10. Examples of storage device 42' may include a hard drive, an optical drive, a RAID array and/or a tape drive, for example) using at least one of a plurality of communication protocols (e.g., SATA protocol, PATA protocol, SCSI protocol, FC protocol and SAS-SSP protocol, for example). Expansion card 48 may be coupled to storage device 42' via data cable 44', examples of which include a SATA cable, a PATA cable, a fibre cable and/or a SCSI cable.

Additionally, expansion card 48 may further include buffer allocation system 46' (to be discussed below in greater detail) which may be capable of maintaining a pool of data buffers for use during I/O transfers between e.g., storage device 42' and a software application (not shown) being executed by host processor 12. As with buffer allocation system 46, buffer allocation system 46' may be implemented in dedicated hardware circuits and/or state machine circuits that may offer enhanced data transmission capabilities (i.e., increased performance). Additionally/alternatively, buffer allocation system 46 (or portions thereof) may be implemented in software and/or firmware, without departing from the spirit and scope of this embodiment.

It should be understood that buffer allocation system 46' may operate in a manner similar to buffer allocation system 46, and will be described herein as operating in a similar manner (but may be provided in separate and distinct embodiments). Thus, for example, an alternative system embodiment may include the buffer allocation system 46' on expansion card 48 (as shown in FIG. 1b), while a separate system embodiment may include buffer allocation system 46 in chipset 18 (as shown in FIG. 1a). Thus, FIG. 1a may illustrate a first embodiment of the buffer allocation system 46 and FIG. 1b may illustrate a second embodiment of buffer allocation system 46'.

Figure 2:
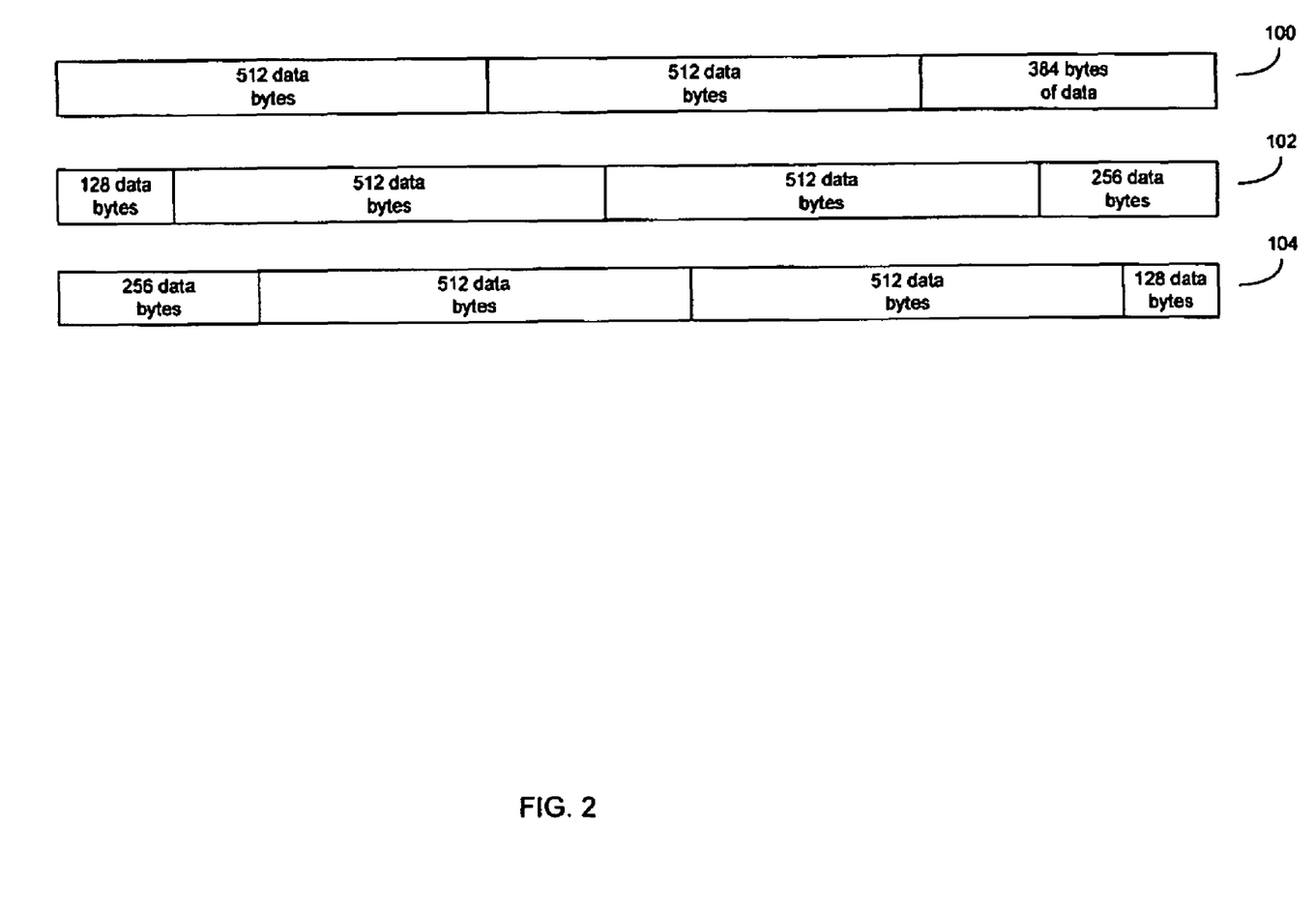
FIG. 2 is a diagrammatic view of a first type of data segment for use with the buffer allocation system of FIG. 1.

Referring also to FIG. 2, when data is received from/transferred to e.g., network 36/36', the data may be received/transferred in data segments 100, 102, 104. Upon receipt and/or prior to transmission, data segment 100, 102, 104 may be temporarily stored in host memory (e.g., source memory/buffers 54) associated with e.g., I/O controller chipset 30. A data segment may be transmitted serially and may include a plurality of data frames that contain a header field and a trailer field for "framing" the data. Protocol control information may be defined as the set of rules utilized by a communication protocol to transmit data from one point to another.

Figure 3:
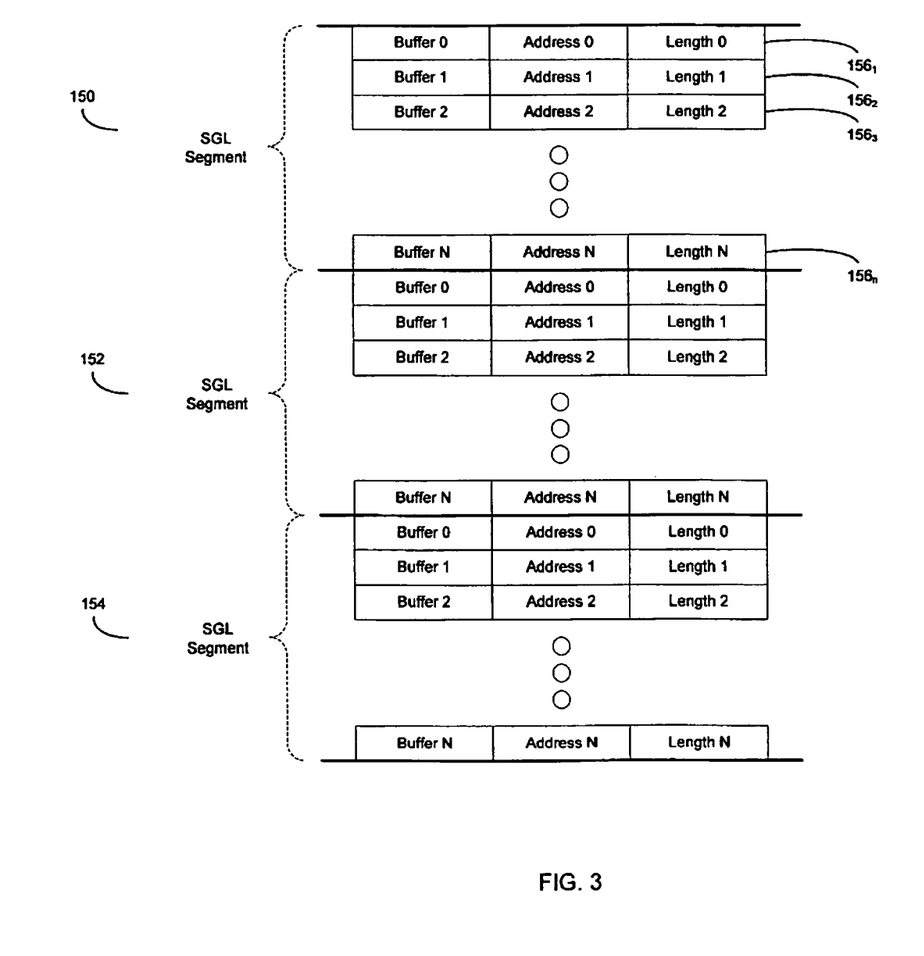
FIG. 3 is a diagrammatic view of a second type of data segment for use with the buffer allocation system of FIG. 1.

Referring also to FIG. 3, when data is received from/transferred to: storage device 42, 42'; and/or a software application (not shown) being executed by host processor 12, the data may be transferred in data segments 150, 152, 154 commonly referred to as SGL (i.e., Scatter-Gather List) data segments. Upon receipt from and/or prior to being provided to storage device 42, 42'; and/or the software application (not shown), data segments 150, 152, 154 may be temporarily stored in host memory (e.g., source memory/buffers 54) associated with e.g., I/O controller chipset 30. An SGL data segment (e.g., segment 150, 152, 154) may include a plurality of individual data portions (e.g., portions $156_{1-n}$) stored within e.g., individual A/L (i.e., address-length) buffer pairs included within the host memory.

As discussed above, chipset 18 and/or expansion card 48 may include buffer allocation system 46, 46' (respectively) that may be capable of maintaining a pool of data buffers (e.g., destination buffers/memory 56 (FIG. 1)) for use during I/O transfers between e.g., storage device 42 and a software application (not shown) being executed by host processor 12.

Figure 4:
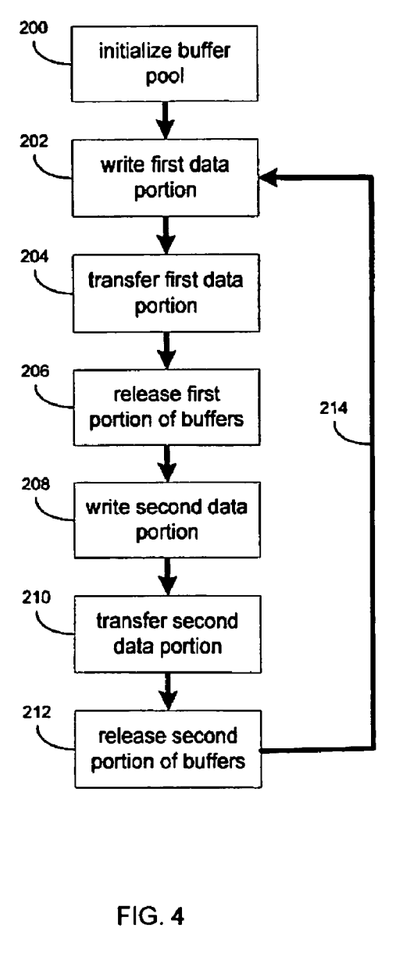
FIG. 4 is a flowchart of a process executed by the buffer allocation system of FIG. 1.
Figure 5A:
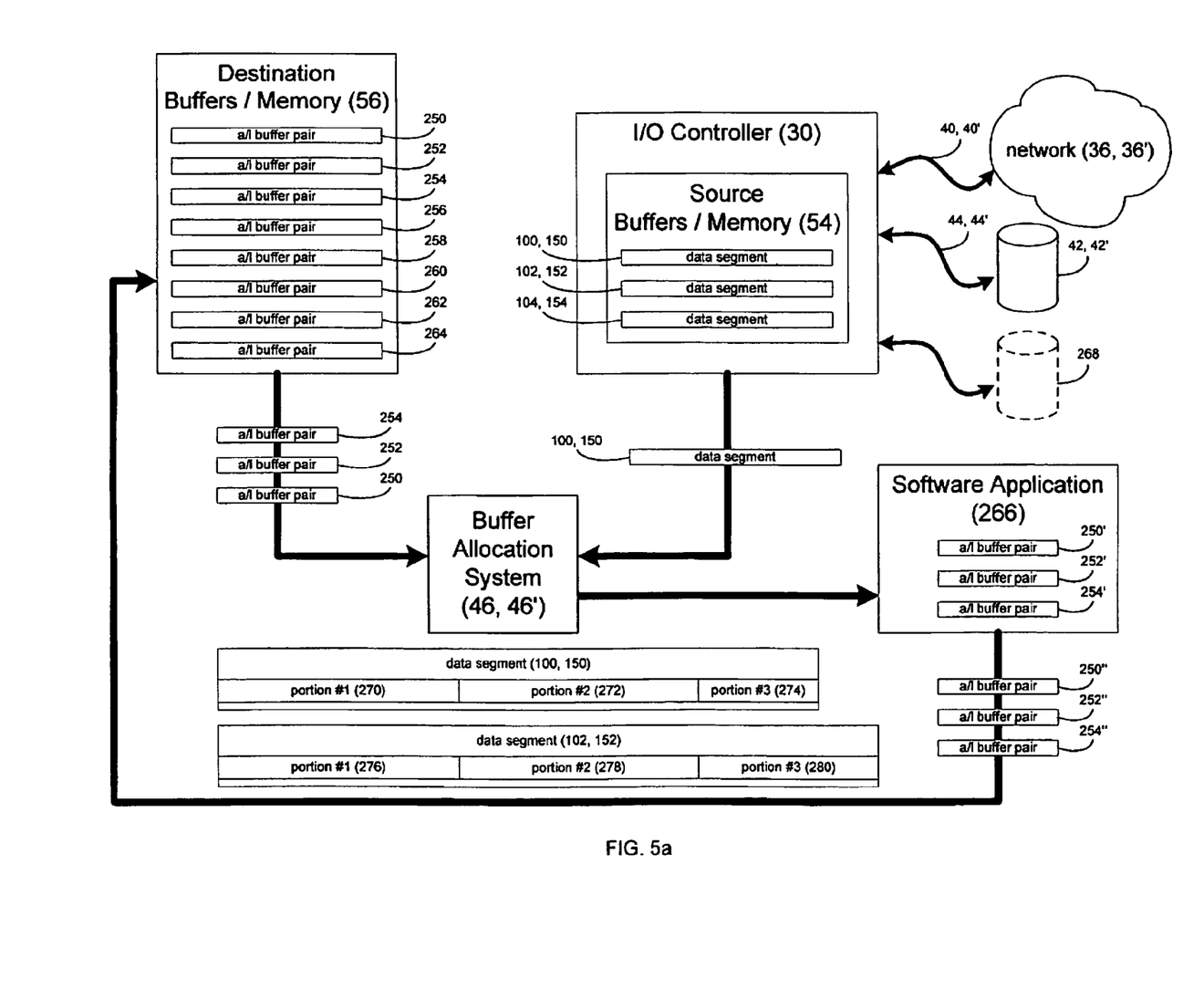
FIG. 5a is a diagrammatic view of the buffer allocation system of FIG. 1 configured for inbound I/O transfers.
Figure 5B:
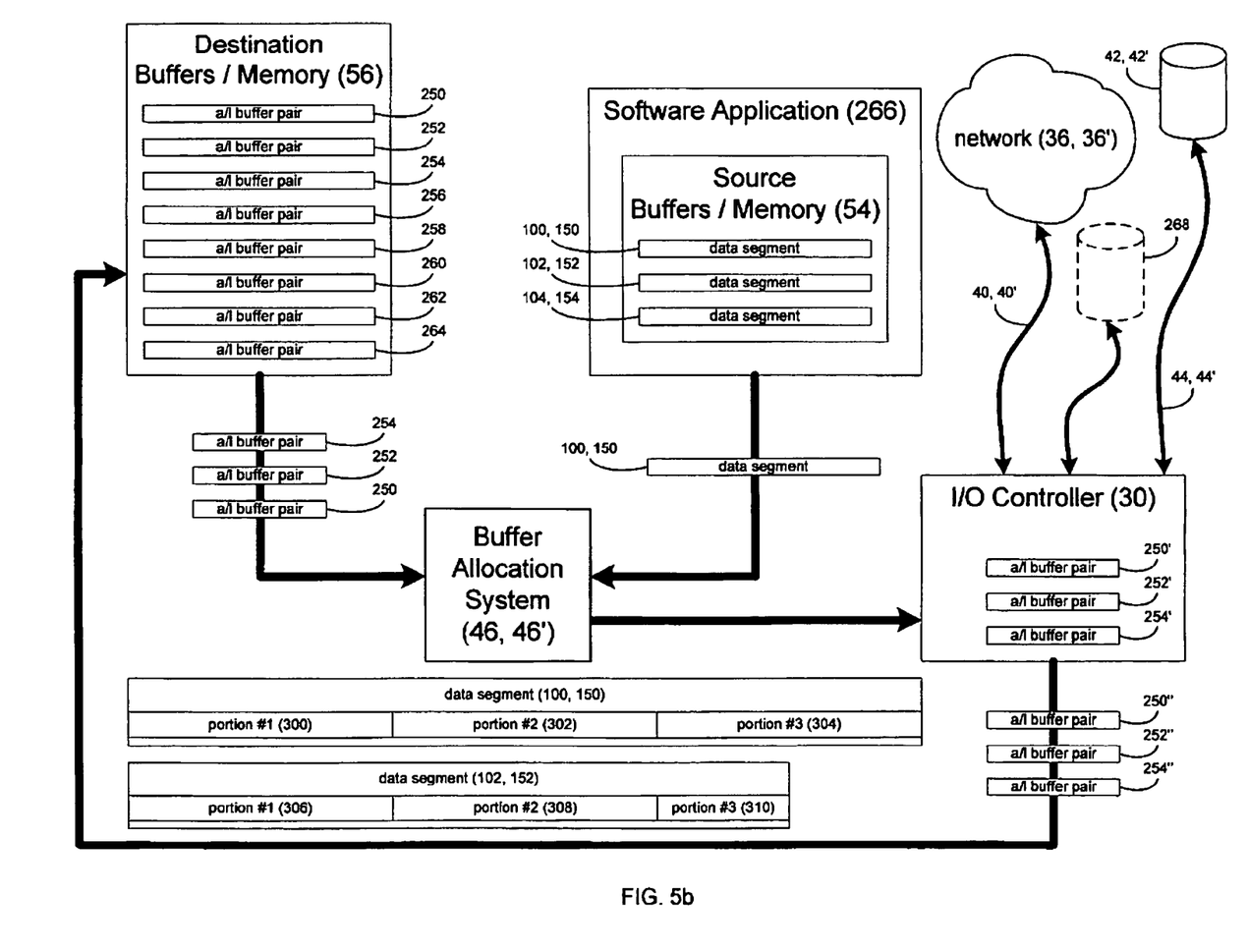
FIG. 5b is a diagrammatic view of the buffer allocation system of FIG. 1 configured for outbound I/O transfers.

Referring generally to FIGS. 4, 5a & 5b, buffer allocation system 46, 46' may initialize 200 a buffer pool (e.g., destination buffers/memory 56). Buffer pool 56 may include a plurality of data buffers (e.g., A/L buffer pairs 250, 252, 254, 256, 258, 260, 262, 264) that are available for use during a plurality of I/O transfers. A typical size for an A/L buffer pair may be four kilobytes. Exemplary (inbound) I/O transfers may include: transfers from network 36, 36' (via I/O controller 30) to software application 266; and transfers from storage device 42, 42' (via I/O controller 30) to software application 266, as shown in FIG. 5a. Additionally/alternatively, exemplary (outbound) I/O transfers may include: transfers from software application 266 (via I/O controller 30) to network 36, 36'; and transfers from software application 266 (via I/O controller 30) to storage device 42, 42', as shown in FIG. 5b.

In response to the initiation of a first I/O transfer concerning a first data portion (e.g., data segment 100, 150) being transferred from a first data source (e.g., storage device 42, 42') to a first data target (e.g., software application 266), the first data portion (e.g., data segment 100, 150) may be written 202 to a first portion (e.g., A/L buffer pairs 250, 252, 254) of the plurality of data buffers (e.g., destination buffers/memory 56). The first data portion (e.g., data segment 100, 150) may be packaged within the first portion (e.g., A/L buffer pairs 250', 252', 254') of the plurality of data buffers (e.g., destination buffers/memory 56), which is transferred 204 to the first data target (e.g., software application 266) for processing.

Once processed, the first portion (e.g., A/L buffer pairs 250", 252", 254") of the plurality of data buffers (e.g., destination buffers/memory 56) may be released 206 back to the buffer pool (e.g., destination buffers/memory 56) for use during one or more subsequent I/O transfers.

In response to the initiation of a second I/O transfer concerning a second data portion (e.g., data segment 102, 152) being transferred from a second data source (e.g., network 36, 36') to a second data target (e.g., second storage device 268; shown in phantom), the second data portion (e.g., data segment 102, 152) may be written 208 to a second portion (e.g., A/L buffer pairs 256, 258, 260) of the plurality of data buffers (e.g., destination buffers/memory 56).

The second data portion (e.g., data segment 102, 152) may be packaged within the second portion (e.g., A/L buffer pairs 256', 258', 260') of the plurality of data buffers (e.g., destination buffers/memory 56), which is transferred 210 to the second data target (e.g., second storage device 268; shown in phantom) for processing.

Once processed, the second portion (e.g., A/L buffer pairs 256", 258", 260") of the plurality of data buffers (e.g., destination buffers/memory 56) may be released 212 back to the buffer pool (e.g., destination buffers/memory 56) for use during one or more subsequent I/O transfers. Processes 202, 204, 206, 208, 210, 212 may be repeated (as illustrated by loop 214) for subsequent data portions.

For example and referring specifically to FIGS. 4 & 5a, assume that each A/L buffer pair is a 1.00 kilobyte buffer. Further, assume that buffer allocation system 46, 46' initializes 200 a buffer pool 56 that includes eight 1.00 kilobyte A/L buffer pairs 250, 252, 254, 256, 258, 260, 262, 264. Additionally, assume that a 2.50 kilobyte data segment 100, 150 is to be transferred from storage device 42, 42' to software application 266 via I/O controller 30. Data segment 100, 150 may be temporarily stored in source buffers/memory 54. Source buffer/memory 54 may be e.g., a plurality of host data buffers included within and/or controlled by I/O controller 30. In addition to data segment 100, 150, other data segments awaiting transfer (e.g., data segments 102, 152 and 104, 154) may also be stored within source memory/buffers 54.

In response to the initiation of an I/O transfer concerning 2.50 kilobyte data segment 100, 150 being transferred from storage device 42, 42' to software application 266, 2.50 kilobyte data segment 100, 150 may be written 202 (by buffer allocation system 46, 46') to one or more of the A/L buffer pairs 250, 252, 254, 256, 258, 260, 262, 264 included within buffer pool 56. The above-described I/O transfer may be initiated by I/O controller 30 and/or software application 266. The number of A/L buffer pairs required to effectuate the I/O transfer may be determined by buffer allocation system 46, 46'. Since (as discussed above), the data segment being transferred (i.e., data segment 100, 150) is 2.50 kilobytes and each A/L buffer pair is a 1.00 kilobyte buffer, three A/L buffer pairs may be required to effectuate the I/O transfer from storage device 42, 42' to software application 266. Accordingly, buffer allocation system 46, 46' may obtain three A/L buffer pairs 250, 252, 254 from buffer pool 56.

The first kilobyte of data segment 100, 150 (i.e., portion 270) may be written 202 (by buffer allocation system 46, 46') to A/L buffer pair 250 (resulting in filled A/L buffer pair 250'); the second kilobyte of data segment 100, 150 (i.e., portion 272) may be written 202 (by buffer allocation system 46, 46') to A/L buffer pair 252 (resulting in filled A/L buffer pair 252'); and the last half kilobyte of data segment 100, 150 (i.e., portion 274) may be written 202 (by buffer allocation system 46, 46') to A/L buffer pair 254 (resulting in filled A/L buffer pair 254').

Depending on the manner in which buffer allocation system 46, 46' is configured, buffer allocation system 46, 46' may immediately transfer 204 each A/L buffer pair (to software application 266) at the time that the A/L buffer pair is filled (i.e., first A/L buffer pair 250', then A/L buffer pair 252', and then A/L buffer pair 254'). Alternatively, buffer allocation system 46, 46' may be configured to only transfer 204 (to software application 266) an A/L buffer pair once all A/L buffer pairs (i.e., A/L buffer pairs 250', 252', 254') are filled.

Once A/L buffer pairs 250', 252', 254' are received by software application 266 and processed (e.g., data segment 100, 150 is extracted and processed or moved to another storage location), A/L buffer pairs 250', 252', 254' may be released 206 (resulting in released A/L buffer pairs 250", 252", 254") back to buffer pool 56 for use during one or more subsequent I/O transfers.

As discussed above, when A/L buffer pair 254 was filled, only 0.50 kilobytes of the 1.00 kilobyte capacity of the buffer pair was utilized. Assume that a second data segment 102, 152 (having a size of 2.75 kilobytes) is temporarily stored in source buffers/memory 54. Further assume that an I/O transfer concerning 2.75 kilobyte data segment 102, 152 being transferred from storage device 268 to software application 266 is initiated. The above-described I/O transfer may be initiated by I/O controller 30 and/or software application 266.

Again, the number of A/L buffer pairs required to effectuate the I/O transfer may be determined by buffer allocation system 46, 46'. Since (as discussed above), the data segment being transferred (i.e., data segment 102, 152) is 2.75 kilobytes and each A/L buffer pair is a 1.00 kilobyte buffer, three A/L buffer pairs may be required to effectuate the I/O transfer from storage device 268 to software application 266. Accordingly, buffer allocation system 46, 46' may obtain three A/L buffer pairs 256, 258, 260 from buffer pool 56.

The first kilobyte of data segment 102, 152 (i.e., portion 276) may be written 208 (by buffer allocation system 46, 46') to A/L buffer pair 256 (resulting in a filled A/L buffer pair; not shown); the second kilobyte of data segment 102, 152 (i.e., portion 278) may be written 208 (by buffer allocation system 46, 46') to A/L buffer pair 258 (resulting in a filled A/L buffer pair; not shown); and the last three-quarters of a kilobyte of data segment 102, 152 (i.e., portion 280) may be written 208 (by buffer allocation system 46, 46') to A/L buffer pair 260 (resulting in a filled A/L buffer pair; not shown).

Again, depending on the manner in which buffer allocation system 46, 46' is configured, buffer allocation system 46, 46' may immediately transfer 210 each A/L buffer pair (to software application 266) at the time that the A/L buffer pair is filled. Alternatively, buffer allocation system 46, 46' may be configured to only transfer 210 (to software application 266) an A/L buffer pair once all of the A/L buffer pairs are filled.

Once the filled A/L buffer pairs (not shown) are received by software application 266 and processed (e.g., data segment 102, 152 is extracted and processed or moved to another storage location), the filled A/L buffer pairs (not shown) may be released 212 back to buffer pool 56 for use during one or more subsequent I/O transfers.

As discussed above, when A/L buffer pair 260 was filled, only 0.75 kilobytes of the 1.00 kilobyte capacity of the buffer pair was utilized. For example and referring specifically to FIGS. 4 & 5b, assume that each A/L buffer pair is a 1.00 kilobyte buffer. Further, assume that buffer allocation system 46, 46' initializes 200 a buffer pool 56 that includes eight 1.00 kilobyte A/L buffer pairs 250, 252, 254, 256, 258, 260, 262, 264. Additionally, assume that a 3.00 kilobyte data segment 100, 150 is to be transferred from software application 266 to storage device 42, 42' via I/O controller 30. Data segment 100, 150 may be temporarily stored in source buffers/memory 54. Source buffer/memory 54 may be e.g., a plurality of application data buffers controlled by software application 266. In addition to data segment 100, 150, other data segments awaiting transfer (e.g., data segments 102, 152 and 104, 154) may also be stored within source memory/buffers 54.

In response to the initiation of an I/O transfer concerning 3.00 kilobyte data segment 100, 150 being transferred from software application 266 to storage device 42, 42', 3.00 kilobyte data segment 100, 150 may be written 202 (by buffer allocation system 46, 46') to one or more of the A/L buffer pairs 250, 252, 254, 256, 258, 260, 262, 264 included within buffer pool 56. The above-described I/O transfer may be initiated by I/O software application 266 and/or controller 30. The number of A/L buffer pairs required to effectuate the I/O transfer may be determined by buffer allocation system 46, 46'. Since (as discussed above), the data segment being transferred (i.e., data segment 100, 150) is 3.00 kilobytes and each A/L buffer pair is a 1.00 kilobyte buffer, three A/L buffer pairs may be required to effectuate the I/O transfer from software application 266 to storage device 42, 42'. Accordingly, buffer allocation system 46, 46' may obtain three A/L buffer pairs 250, 252, 254 from buffer pool 56.

The first kilobyte of data segment 100, 150 (i.e., portion 300) may be written 202 (by buffer allocation system 46, 46') to A/L buffer pair 250 (resulting in filled A/L buffer pair 250'); the second kilobyte of data segment 100, 150 (i.e., portion 302) may be written 202 (by buffer allocation system 46, 46') to A/L buffer pair 252 (resulting in filled A/L buffer pair 252'); and the third kilobyte of data segment 100, 150 (i.e., portion 304) may be written 202 (by buffer allocation system 46, 46') to A/L buffer pair 254 (resulting in filled A/L buffer pair 254').

Depending on the manner in which buffer allocation system 46, 46' is configured, buffer allocation system 46, 46' may immediately transfer 204 each A/L buffer pair (to I/O controller 30) at the time that the A/L buffer pair is filled (i.e., first A/L buffer pair 250', then A/L buffer pair 252', and then A/L buffer pair 254'). Alternatively, buffer allocation system 46, 46' may be configured to only transfer 204 (to I/O controller 30) an A/L buffer pair once all A/L buffer pairs (i.e., A/L buffer pairs 250', 252', 254') are filled.

Once A/L buffer pairs 250', 252', 254' are received by I/O controller 30 and processed (e.g., data segment 100, 150 is extracted and processed, moved to another storage location, and/or provided to storage device 42, 42'), A/L buffer pairs 250', 252', 254' may be released 206 (resulting in released A/L buffer pairs 250", 252", 254") back to buffer pool 56 for use during one or more subsequent I/O transfers.

Assume that a second data segment 102, 152 (having a size of 2.50 kilobytes) is temporarily stored in source buffers/memory 54. Further assume that an I/O transfer concerning 2.50 kilobyte data segment 102, 152 being transferred from software application 266 to storage device 268 is initiated. The above-described I/O transfer may be initiated by software application 266 and/or I/O controller 30.

Again, the number of A/L buffer pairs required to effectuate the I/O transfer may be determined by buffer allocation system 46, 46'. Since (as discussed above), the data segment being transferred (i.e., data segment 102, 152) is 2.50 kilobytes and each A/L buffer pair is a 1.00 kilobyte buffer, three A/L buffer pairs may be required to effectuate the I/O transfer from software application 266 to storage device 268. Accordingly, buffer allocation system 46, 46' may obtain three A/L buffer pairs 256, 258, 260 from buffer pool 56.

The first kilobyte of data segment 102, 152 (i.e., portion 306) may be written 208 (by buffer allocation system 46, 46') to A/L buffer pair 256 (resulting in a filled A/L buffer pair; not shown); the second kilobyte of data segment 102, 152 (i.e., portion 308) may be written 208 (by buffer allocation system 46, 46') to A/L buffer pair 258 (resulting in a filled A/L buffer pair; not shown); and the last half kilobyte of data segment 102, 152 (i.e., portion 310) may be written 208 (by buffer allocation system 46, 46') to A/L buffer pair 260 (resulting in a filled A/L buffer pair; not shown).

Again, depending on the manner in which buffer allocation system 46, 46' is configured, buffer allocation system 46, 46' may immediately transfer 210 each A/L buffer pair (to I/O controller 30) at the time that the A/L buffer pair is filled. Alternatively, buffer allocation system 46, 46' may be configured to only transfer 210 (to I/O controller 30) an A/L buffer pair once all of the A/L buffer pairs are filled.

Once the filled A/L buffer pairs (not shown) are received by to I/O controller 30 and processed (e.g., data segment 102, 152 is extracted and processed, moved to another storage location, and/or provided to storage device 268), the filled A/L buffer pairs (not shown) may be released 212 back to buffer pool 56 for use during one or more subsequent I/O transfers.

As discussed above, when A/L buffer pair 260 was filled, only 0.50 kilobytes of the 1.00 kilobyte capacity of the buffer pair was utilized.

As discussed above, during a data transfer (e.g., an SAS-SSP data transfer), data segment 100, 150 may be temporarily stored in source buffers/memory 54. Source buffer/memory 54 may be e.g., a plurality of host data buffers included within and/or controlled by e.g., I/O controller 30. In addition to monitoring the available buffer space in source buffers/memory 54, buffer allocation system 46 may monitor the remaining buffer space available in each A/L pair. Accordingly, buffer allocation system 46 may be configured to only allow for the transfer of a data segment having a maximum size that is less than or equal to the smaller of: (a) the available buffer space in source buffers/memory 54 and (b) the remaining buffer space available in the destination A/L pair; thus preventing a memory overflow in either of the source or destination memory devices.

Additionally, when processing multiple outstanding I/O transfers concerning the same source device or destination device, buffer allocation system 46 may be configured to only allow for the transfer of a data segment having a maximum size that is less than or equal to the smaller of: (a) the available buffer space in source buffers/memory 54 and (b) the minimum remaining buffer space available in any destination A/L pair being used for the transfer. For example, if source buffers/memory 54 has four kilobytes of available buffer space, A/L pair #1 has two kilobytes of available buffer space, A/L pair #2 has one kilobyte of available buffer space, and A/L pair #3 has four kilobytes of available buffer space, buffer allocation system 46 may limit the data segment transfer size to one kilobyte (i.e., the available buffer space of A/L pair #2).

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims.

Other modifications, variations, and alternatives are also possible. Accordingly, the claims are intended to cover all such equivalents.

What is claimed is:

1. A method comprising:

initializing a buffer pool, wherein the buffer pool includes a plurality of data buffers available for use during a plurality of I/O transfers;

monitoring the buffer pool and a source buffer associated with a first data source to determine an available size of the source buffer and each of the plurality of data buffers of the buffer pool;

in response to the initiation of a first I/O transfer concerning a first data portion being transferred from the first data source to a first data target, writing the first data portion to a first portion of the plurality of data buffers;

transferring the first data portion to the first data target only if the first data portion has a size that is less than or equal to the smaller of: (a) the available buffer space in the source buffer and (b) the available buffer space in the first portion of the plurality of data buffers;

releasing the first portion of the plurality of data buffers back to the buffer pool for use during one or more subsequent I/O transfers;

in response to the initiation of a subsequent I/O transfer concerning a subsequent data portion being transferred from the first data source to the first data target, writing the subsequent data portion to an available portion of the plurality of data buffers; and transferring the subsequent data portion to the first data target only if the subsequent data portion has a size that is less than or equal to the smaller of: (a) the available buffer space in the source buffer and (b) the minimum remaining available buffer space in any one of the plurality of data buffers.

2. The method of claim 1 wherein the first data source is a software application, and the plurality of data buffers includes a plurality of application data buffers.

3. The method of claim 1 wherein the first data source is a host device, and the plurality of data buffers includes a plurality of host data buffers.

4. The method of claim 1 wherein the first data target is one of a host device; and a software application.

5. The method of claim 1 wherein the first data portion includes a scatter-gather list (SGL) segment.

6. The method of claim 1 further comprising:

in response to the initiation of a second I/O transfer concerning a second data portion being transferred from a second data source to a second data target, writing the second data portion to a second portion of the plurality of data buffers;

transferring the second data portion to the second data target; and releasing the second portion of the plurality of data buffers back to the buffer pool for use during one or more subsequent I/O transfers.

7. A computer program product residing on a computer readable non-transitory storage medium having a plurality of instructions stored thereon which, when executed by a processor, cause the processor to perform operations comprising:

initializing a buffer pool, wherein the buffer pool includes a plurality of data buffers available for use during a plurality of I/O transfers;

monitoring the buffer pool and a source buffer associated with a first data source to determine an available size of the source buffer and each of the plurality of data buffers of the buffer pool;

in response to the initiation of a first I/O transfer concerning a first data portion being transferred from the first data source to a first data target, writing the first data portion to a first portion of the plurality of data buffers;

transferring the first data portion to the first data target only if the first data portion has a size that is less than or equal to the smaller of: (a) the available buffer space in the source buffer and (b) the available buffer space in the first portion of the plurality of data buffers;

releasing the first portion of the plurality of data buffers back to the buffer pool for use during one or more subsequent I/O transfers;

in response to the initiation of a subsequent I/O transfer concerning a subsequent data portion being transferred from the first data source to the first data target, writing the subsequent data portion to an available portion of the plurality of data buffers; and transferring the subsequent data portion to the first data target only if the subsequent data portion has a size that is less than or equal to the smaller of: (a) the available buffer space in the source buffer and (b) the minimum remaining available buffer space in any one of the plurality of data buffers.

8. The computer program product of claim 7 wherein the first data source is a software application, and the plurality of data buffers includes a plurality of application data buffers.

9. The computer program product of claim 7 wherein the first data source is a host device, and the plurality of data buffers includes a plurality of host data buffers.

10. The computer program product of claim 7 wherein the first data target is one of: a host device; and a software application.

11. The computer program product of claim 7 wherein the first data portion includes a scatter-gather list (SGL) segment.

12. The computer program product of claim 7 further comprising instructions for:

in response to the initiation of a second I/O transfer concerning a second data portion being transferred from a second data source to a second data target, writing the second data portion to a second portion of the plurality of data buffers;

transferring the second data portion to the second data target; and releasing the second portion of the plurality of data buffers back to the buffer pool for use during one or more subsequent I/O transfers.

13. A system comprising:

a circuit card comprising an integrated circuit, the circuit card being capable of being coupled to a bus of a host system, the integrated circuit capable of:

initializing a buffer pool, wherein includes a plurality of data buffers available for use during a plurality of I/O transfers;

monitoring the buffer pool and a source buffer associated with a first data source to determine an available size of the source buffer and each of the plurality of data buffers of the buffer pool;

in response to the initiation of a first I/O transfer concerning a first data portion being transferred from the first data source to a first data target, writing the first data portion to a first portion of the plurality of data buffers;

transferring the first data portion to the first data target only if the first data portion has a size that is less than or equal to the smaller of: (a) the available buffer space in the source buffer and (b) the available buffer space in the first portion of the plurality of data buffers;

releasing the first portion of the plurality of data buffers back to the buffer pool for use during one or more subsequent I/O transfers;

in response to the initiation of a subsequent I/O transfer concerning a subsequent data portion being transferred from the first data source to the first data target, writing the subsequent data portion to an available portion of the plurality of data buffers; and transferring the subsequent data portion to the first data target only if the subsequent data portion has a size that is less than or equal to the smaller of: (a) the available buffer space in the source buffer and (b) the minimum remaining available buffer space in any one of the plurality of data buffers.

14. The system of claim 13 wherein the first data source is a software application, and the plurality of data buffers includes a plurality of application data buffers.

15. The system of claim 13 wherein the first data source is a host device, and the plurality of data buffers includes a plurality of host data buffers.

16. The system of claim 13 wherein the first data target is one of: a host device; and a software application.

17. The system of claim 13 wherein the first data portion includes a scatter-gather list (SGL) segment.

18. The system of claim 13, wherein the integrated circuit is further capable of:

in response to the initiation of a second I/O transfer concerning a second data portion being transferred from a second data source to a second data target, writing the second data portion to a second portion of the plurality of data buffers;

transferring the second data portion to the second data target; and releasing the second portion of the plurality of data buffers back to the buffer pool for use during one or more subsequent I/O transfers.

19. An integrated circuit capable of:

initializing a buffer pool, wherein the buffer pool includes a plurality of data buffers available for use during a plurality of I/O transfers;

monitoring the buffer pool and a source buffer associated with a first data source to determine an available size of the source buffer and each of the plurality of data buffers of the buffer pool;

in response to the initiation of a first I/O transfer concerning a first data portion being transferred from the first data source to a first data target, writing the first data portion to a first portion of the plurality of data buffers;

transferring the first data portion to the first data target only if the first data portion has a size that is less than or equal to the smaller of: (a) the available buffer space in the source buffer and (b) the available buffer space in the first portion of the plurality of data buffers;

releasing the first portion of the plurality of data buffers back to the buffer pool for use during one or more subsequent I/O transfers;

in response to the initiation of a subsequent I/O transfer concerning a subsequent data portion being transferred from the first data source to the first data target, writing the subsequent data portion to an available portion of the plurality of data buffers; and transferring the subsequent data portion to the first data target only if the subsequent data portion has a size that is less than or equal to the smaller of: (a) the available buffer space in the source buffer and (b) the minimum remaining available buffer space in any one of the plurality of data buffers.

20. The integrated circuit of claim 19 wherein the first data source is a software application, and the plurality of data buffers includes a plurality of application data buffers.

21. The integrated circuit of claim 19 wherein the first data source is a host device, and the plurality of data buffers includes a plurality of host data buffers.

22. The integrated circuit of claim 19 wherein the first data target is one of: a host device; and a software application.

23. The integrated circuit of claim 19 wherein the first data portion includes a scatter-gather list (SGL) segment.

24. The integrated circuit of claim 19, wherein the integrated circuit is further capable of:

in response to the initiation of a second I/O transfer concerning a second data portion being transferred from a second data source to a second data target, writing the second data portion to a second portion of the plurality of data buffers;

transferring the second data portion to the second data target; and releasing the second portion of the plurality of data buffers back to the buffer pool for use during one or more subsequent I/O transfers.

* * * * *